March 24, 1953 J. C. REED, JR 2,632,847

PULSE FORMING CIRCUIT

Filed Feb. 4, 1946

INVENTOR
JOHN C. REED JR.
BY [signature]
ATTORNEY

Patented Mar. 24, 1953 2,632,847

UNITED STATES PATENT OFFICE 2,632,847

PULSE FORMING CIRCUIT

John C. Reed, Jr., Boston, Mass., assignor, by mesne assignments, to the United States of America as represented by the Secretary of the Navy Application February 4, 1946, Serial No. 645,433

4 Claims. (Cl. 250—27)

This invention relates to electronic pulse forming circuits and more particularly to double pulse forming circuits useful for radar time communication systems.

Heretofore, electronic pulse forming circuits were undesirable for use where recovery time of the pulse generating circuit was of prime importance, for example where two successive, closely spaced pulses are required.

The general object of the present invention is to overcome the foregoing difficulties.

Another object of the present invention is to provide an electronic pulse forming circuit in which the recovery time is extremely short.

A further object is to provide an electronic pulse forming circuit to form two pulses in which the spacing between the pulses can be varied as a linear function with voltage.

A still further object is to provide a double pulse forming circuit controlled by a multivibrator or other rectangular wave generator.

With these objects in view a pulse forming line is inserted in parallel with a transformer in the plate circuit of one tube in a multivibrator such that two pulses are formed, one at the beginning and the other at the end of the gate from the plate circuit, whose characteristics depend on the pulse forming line and whose time spacing is a linear function of voltage applied to the multivibrator.

The above and other objects will be apparent from the following specification when taken with the accompanying drawing, in which.

Figure 1:
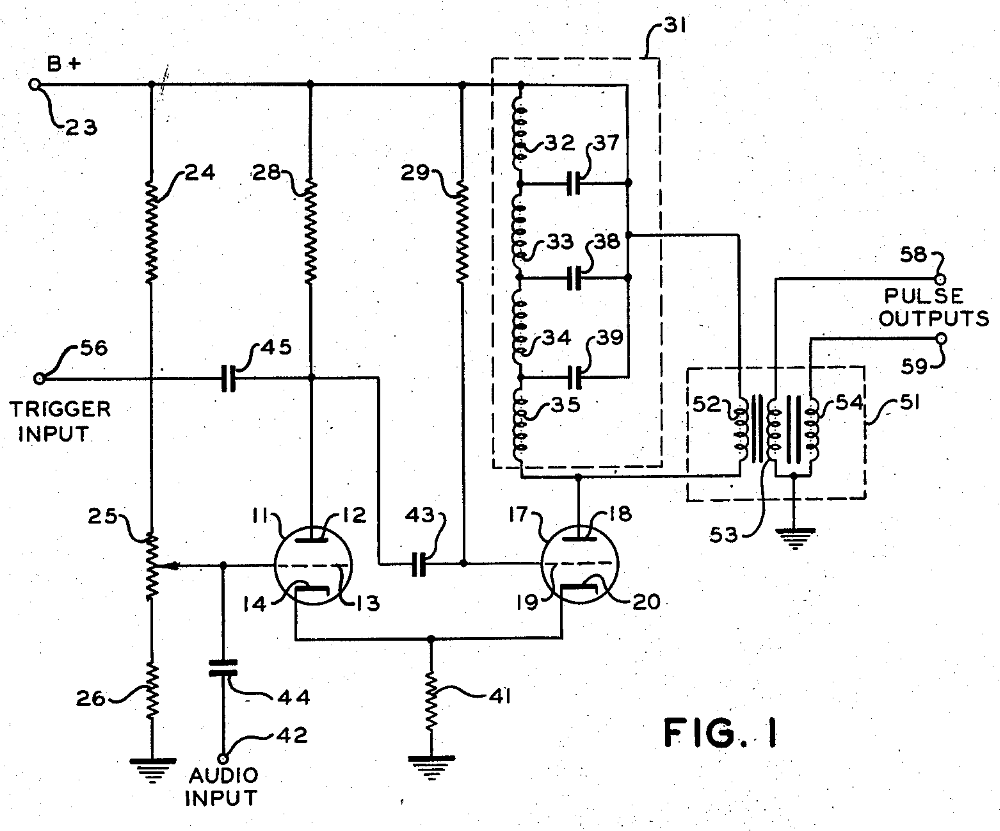
Fig. 1 is a schematic diagram of one form of the invention.

Referring to the drawing, this invention comprises a multivibrator having thermionic tubes 11 and 17 and the necessary circuit components such as resistors 24, 25, 26, 28, 29, and 41 and condenser 43, a pulse forming line 31, and a pulse transformer 51, or other suitable coupling device. A trigger input 61 (Fig. 2) is applied at 56 through coupling condenser 45 to initiate the cycle of operation of the multivibrator and produce in tube 17 a plate current wave form 62. At time $t_1$ when tube 17 is cut off and plate current ceases to flow the release of the energy stored in the magnetic field of the pulse forming line 31 will produce at the output 58 a pulse 66 whose time duration is dependent on the characteristics of the pulse forming line 31. When at time $t_2$, due to normal multivibrator action, plate current again starts to flow in tube 17, the replacement of energy in the pulse forming line 31 will produce at the output 59 a pulse 69 whose time duration is also dependent on the characteristics of the pulse forming line 31 and is the same duration as that of pulse 66. Thus, it is seen two identical pulses 66 and 69 of the same polarity are produced at the outputs 58 and 59. If pulses of the opposite polarity are desired, those shown in Fig. 2 as 67 and 68 may be used. Furthermore, the time separation of the two pulses 66 and 69 (or 67 and 68) can be made any desired amount by the correct selection of circuit constants and voltages in the multivibrator and more specifically, as shown in Fig. 1, by controlling the bias on grid 13 of tube 11 by means of the potentiometer 25. The time separation can also be varied by the audio input source at 42.

The multivibrator of Fig. 1 has two thermionic tubes 11 and 17 each having at least a plate, a grid, and a cathode, and these may be in separate envelopes as shown in Fig. 1 or may be incorporated in a single envelope. The tube 11 comprises a plate 12, a control grid 13, and a cathode 14, while the tube 17 comprises a plate 18, a control grid 19, and a cathode 20. The heaters for these cathodes together with their energizing circuits have been omitted in the drawing for clearness. Plate 12 of tube 11 is connected to a source of positive potential 23 through a suitable resistor 28. Plate 18 of tube 17 is connected to the same source of positive potential 23 through the pulse forming line 31 in parallel with the primary 52 of transformer 51. The pulse forming line 31 in parallel with primary 52 replaces the resistor (similar to resistor 28 connected to plate 12 of tube 11) normally used in most multivibrators. Control grid 19 of tube 17 in the quiescent condition of this multivibrator is maintained at a potential slightly positive with respect to its cathode 20 by means of its connection to the positive source of potential 23 through resistor 29, whose resistance is large in comparison with resistor 28. The slight positive bias on control grid 19 is due to the flow of grid current. The cathodes 14 and 20 of tubes 11 and 17 respectively are connected together and to ground through resistor 41. Grid 13 is given a suitable bias by means of potentiometer 25. It will be shown as the description progresses that the resistors 24 and 26 and the potentiometer 25 for the biasing of grid 13 must be so chosen that, with them connected in series between the positive source of potential 23 and ground as shown in Fig. 1, there will be found at various points on potentiometer 25 suitable potentials to bias tube 11 below cut off during the quiescent period of the multivibrator when tube 17 is conducting, and also these same potentials must be suitable for controlling the flow of plate current in tube 11 during its conducting period.

In the quiescent condition of this multivibrator tube 17 is conducting, since its grid has a slightly positive bias due to its connection to a positive potential through the large resistor 29. This conduction causes the current flowing in the cathode 20 to produce a voltage drop across resistor 41 such that both cathodes 14 and 20, being connected together, are maintained at a positive potential with respect to ground. If the potential at the grid 13 of tube 11, as determined by the potentiometer 25, is sufficiently below the potential at the cathode 14 to keep tube 11 cut off, there will be no conduction in tube 11 during the quiescent condition of this multivibrator. This quiescent condition occurs during the interval after $t_2$ and before $t_1$ as shown on the graph of Fig. 2, which also shows by wave form 62 the current flowing through tube 17 during the quiescent condition.

Figure 2:
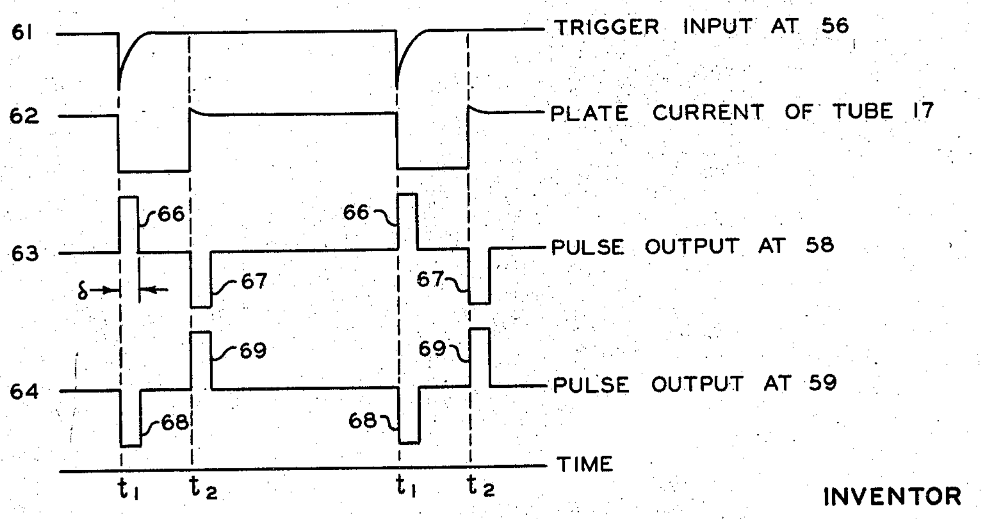
Fig. 2 is a graph of certain waveforms useful in explaining the operation of the invention.

At time $t_1$ a negative trigger, such as 61 in Fig. 2, is brought in through coupling condensers 45 and 43 to grid 19 of tube 17 to initiate a cycle of operation of the multivibrator. The negative trigger applied to grid 19 reduces the current flowing in cathode 20 of tube 17 thereby reducing the voltage drop across resistor 41 and thus the potential of cathode 14 of tube 11. The trigger used must be of sufficient magnitude that the new potential at cathode 14 will allow tube 11 to start conducting. As tube 11 starts to conduct its plate 12 drops in potential due to current flowing through resistor 28. This drop in potential is coupled through condenser 43 to grid 19 further reducing the current in tube 17. Thus it can be seen a regenerative action takes place so that soon after time $t_1$ tube 17 is cut off and tube 11 is conducting.

Now just prior to time $t_1$ condenser 43 was charged to the difference in potential between the grid 19 of tube 17 and the plate 12 of tube 11 which is the same as positive potential 23 since no current is flowing in resistor 28. At time $t_1$, as the plate 12 drops in potential, the grid 19 will instantaneously drop in potential the same amount driving tube 17 below cut off. The condenser then proceeds to discharge through resistors 29 and 28 principally. This discharge will cause the potential at the grid 19 to rise almost linearly with time toward the positive potential 23. It will continue to rise until, at time $t_2$, it reaches the cut off potential of tube 17 so that it starts to conduct, raising the potential of cathodes 14 and 20, and cutting off tube 11 so that plate 12 and grid 19 rise. This constitutes a regenerative action similar to that which took place at time $t_1$ so that the multivibrator now reverts to its quiescent condition.

The time from $t_1$ to $t_2$ is determined by the time necessary for condenser 43 to discharge to the point at which tube 17 again starts to conduct. This time is determined by the time constant of discharge of condenser 43 which is primarily determined by the size of resistor 29 and condenser 43; it is also determined by the amount the potential at grid 19 must rise after time $t_1$ which in turn is determined by the amount of the drop in potential at the plate 12 at the time $t_1$ which can be controlled by setting the bias for tube 11 and thus the amount of current flowing through resistor 28. This time from $t_1$ to $t_2$ comprises the gate mentioned previously and determine the time spacing of the output pulses 66 and 69. A small audio input voltage at terminal 42 applied to grid 13 of tube 11 through coupling condenser 44 will cause the time from $t_1$ to $t_2$ to vary at the same audio frequency, the amount of separation being substantially proportional to the amplitude of the audio input voltage.

The pulse forming line 31 of Fig. 1 comprises the small inductors 32, 33, 34, and 35, and the small condensers 37, 38, and 39, and in parallel with primary 52 of transformer 51 is located in the plate circuit of tube 17. This pulse forming line is also known as an artificial line where the inductors and the condensers as lumped constants replace the actual series inductance and shunt capacitance of a real transmission line. The previously mentioned characteristics of the pulse forming line are determined by the size of the inductors and condensers, the number of each used, and the manner in which they are connected to form the complete line. An artificial line as shown in Fig. 1, may have its inductors connected in series in one lead of the line, the other lead being simply a short wire or other conductor, and the condensers connected one each from the junctions of the inductors to the other lead. Other connections and number of components than that shown in Fig. 1 are possible; any network having similar external characteristics to that shown in Fig. 1 is equally satisfactory.

The time duration in seconds of a pulse produced by this line would be $$\delta=2N\sqrt{LC}$$

where $N$= the number of sections;
$L$=the inductance per section; and,
$C$=the capacitance per section.

Considering the line shown in Fig. 1 as made up of T-sections, the number of sections here is three, the inductance per section is that of either inductors 33 or 34 (inductors 32 and 35 ideally should have a value L/2; however, for convenience a value L may be used), and the capacitance per section is that of condensers 37, 38, or 39. Therefore, a pulse forming line can be designed to generate a pulse of any desired time duration. Thus for a given pulse duration, a certain number of sections will be required if L and C are fixed. However, by reducing L or C or both, and using more sections, a more nearly rectangular pulse will be generated.

Now the pulse forming line used in this invention is the equivalent of a short-circuited transmission line and is connected in parallel with primary 52 of transformer 51 in the plate circuit of tube 17. Such a short-circuited line during its pulse forming period may be considered as an equivalent constant current generator shunted by its characteristic impedance where the constant current I is that which was flowing through the line during the quiescent or conducting period of tube 17, and the characteristic impedance is $Z_c=\sqrt{L/C}$ ohms; L and C being defined as above. For proper operation of this invention, in order to avoid reflections, the characteristic impedance of the pulse forming line should be equal to the input impedance of the primary winding 52 of transformer 51 or to the input impedance of any other coupling device used. If such is the case the energy stored in the magnetic field of the line 31 at time $t_1$, when tube 17 is cut off, will send a wave I/2 through primary winding 52, that being the only path remaining, a similar wave I/2 will travel down line 31 away from plate 18 which at the end of time $\delta$ will have been reflected from the far end of the line such as to remove all the energy stored in the line, and current will cease to flow in primary winding 52. Likewise at time $t_2$, when tube 17 again begins to conduct a current wave I/2, opposite in direction to that at time $t_1$, will flow through primary winding 52, and a similar wave I/2 flows through line 31, the two waves added together supplying the current I for tube 17. Again at the end of time $\delta$ the wave I/2 will have been reflected from the far end of the line so as to restore a current I to the line, ending the wave of I/2 in primary 52, and supplying the current I for tube 17.

The transformer 51 comprises a primary winding 52 and secondary windings 53 and 54 so wound and connected that the output voltages at their terminals 58 and 59, respectively, are equal in amplitude and opposite in polarity. This transformer 51 must be able to pass all the frequencies present in the rectangular pulse desired. The previously mentioned current wave I/2 flowing in primary winding 52 at time $t_1$ will produce a voltage pulse 66 in secondary winding 53 and also a similar voltage pulse 68 of opposite polarity in secondary winding 54. Likewise the current wave I/2 flowing in the opposite direction in primary winding 52 at time $t_2$ will produce a voltage pulse 67 in secondary winding 53 having the same polarity as pulse 68 and also a similar voltage pulse 69 in secondary winding 54 having the same polarity as pulse 66. Thus the desired double pulse may be obtained at the output terminals 58 and 59 as pulses 66 and 69 or as pulses 68 and 67 depending on the polarity desired.

It will be seen from the above description that the embodiment of the invention shown in Fig. 1 provides a multivibrator of the one-shot type having a source of audio input voltage and a trigger input, a pulse forming line, and a pulse transformer by means of which double pulses of a given time duration and variable time spacing may be produced by adjusting certain components or voltages in the circuit.

Various modifications may be made in the invention without departing from the spirit thereof. It is to be understood that while the invention has been disclosed in connection with a multivibrator of the type shown in patent application Serial No. 512,931, filed December 4, 1943, of B. Chance, the invention may be used with any rectangular pulse generating circuit.

However, the multivibrator shown has the advantage that the functioning of the plate circuit of tube 17 has no effect on the regenerative circuit due to the use of cathode coupling, and furthermore, that the gate width and hence pulse spacing is easily controlled as a linear function by the bias voltage on grid 13 of tube 11.

It is to be further understood that while the invention has been disclosed in connection with a short-circuited artificial line in parallel with a pulse transformer, the invention may be used with any other type of equivalent network in parallel with any suitable coupling device. However, a pulse transformer having dual secondary windings and dual outputs permits obtaining pulses of like polarity directly.

What is claimed is:

1. An electronic pulse-forming circuit for producing closely spaced double pulses comprising a source of direct current energy, a source of voltage pulses, a short circuited pulse-forming delay line, a load circuit, a multivibrator including two electron tubes biased to have one of said electron tubes normally conducting and the other of said electron tubes normally non-conducting, means for energizing said multivibrator from said direct current source, said means including said pulse-forming line in the output circuit of said normally conducting tube, a transformer for coupling said load circuit to said pulse-forming line, and means applying said voltage pulses to bias said non-conducting tube to conduction and said conducting tube to non-conduction to initiate the formation of a rectangular wave form pulse from each voltage pulse, thereby producing two output pulses, one when said normally conducting tube becomes non-conducting and the other when said normally conducting tube is restored to normal operation, the time separation of said two output pulses being a function of said multivibrator time constants and bias potentials, the time duration of said pulses being a function of said delay line characteristics, and the pulse repetition rate being determined by the repetition rate of said voltage pulse source.

2. An electronic pulse-forming circuit for producing closely spaced double pulses comprising a source of direct current energy, a source of voltage pulses, a short circuited pulse-forming delay line, a load circuit, a multivibrator including two electron tubes biased to have one of said electron tubes normally non-conducting, means for energizing said multivibrator from said direct current source, said means including said pulse-forming line in the output circuit of said normally conducting tube, a transformer for coupling said load circuit to said pulse-forming line, means applying said voltage pulses to bias said non-conducting tube to conduction and said conducting tube to non-conduction to initiate the formation of a rectangular wave form pulse from each voltage pulse, thereby producing two output pulses, one when said normally conducting tube becomes non-conducting and the other when said normally conducting tube is restored to normal operation, the time separation of said two output pulses being a function of said multivibrator time constants and bias potentials, the time duration of said pulses being a function of said delay line characteristics, the pulse repetition rate being determined by the repetition rate of said voltage pulse source, and a source of audio frequency voltage applied to bias said multivibrator to control the time separation of said two output pulses at said audio frequency.

3. An electronic pulse-forming circuit for producing closely spaced double pulses comprising a source of direct current energy, a source of voltage pulses, a pulse forming line, a load coupling transformer, a multivibrator circuit including two electron tubes biased to have one of said tubes normally conducting and the other normally non-conducting, means including said pulse-forming line and said transformer for energizing said multivibrator from said director current source, and means applying said voltage pulses to bias said multivibrator to single pulse operation, whereby double output pulses are produced in said line as said normally conducting tube becomes non-conducting followed by restoration to normal conduction.

4. An electronic pulse-forming circuit for producing closely spaced double pulses comprising a source of direct current energy, a source of voltage pulses, a pulse-forming line, a load coupling transformer, a multivibrator circuit including two electron tubes biased to have one of said tubes normally conducting and the other normally non-conducting, means including said pulse-forming line and said transformer for energizing said multivibrator from said direct current source, means applying said voltage pulses to bias said multivibrator to single pulse operation, whereby double output pulses are produced in said line as said normally conducting tube becomes non-conducting followed by restoration to normal conduction, and a source of audio frequency voltage applied to bias said multivibrator to control the time spacing of said double output pulses.

JOHN C. REED, JR.

REFERENCES CITED

The following references are of record in the file of this patent:

UNITED STATES PATENTS

| Number | Name | Date |
|---|---|---|
| 2,188,970 | Wilson | Feb. 6, 1940 |
| 2,221,666 | Wilson | Nov. 12, 1940 |
| 2,255,839 | Wilson | Sept. 16, 1941 |
| 2,266,154 | Blumlein | Dec. 16, 1941 |
| 2,266,401 | Reeves | Dec. 16, 1941 |
| 2,338,512 | Harmon | Jan. 4, 1944 |
| 2,394,389 | Lord | Feb. 5, 1946 |
| 2,405,237 | Ruhlig | Aug. 6, 1946 |
| 2,406,978 | Wendt et al. | Sept. 3, 1946 |
| 2,445,448 | Miller | July 20, 1948 |